No. 895,943. PATENTED AUG. 11, 1908.
D. BENNETT.
MANUFACTURE OF FUEL BRIQUETS.
APPLICATION FILED OCT. 12, 1907.

2 SHEETS—SHEET 1.

WITNESSES
John H. Lynch.

INVENTOR
Delbert Bennett
BY
Munn & Co.
ATTORNEYS

No. 895,943.

PATENTED AUG. 11, 1908.

D. BENNETT.
MANUFACTURE OF FUEL BRIQUETS.
APPLICATION FILED OCT. 12, 1907.

WITNESSES
John N. Lynch.

INVENTOR
Delbert Bennett
BY Munn & Co
ATTORNEYS

UNITED STATES PATENT OFFICE.

DELBERT BENNETT, OF BATTLE CREEK, MICHIGAN.

MANUFACTURE OF FUEL-BRIQUETS.

No. 895,943.  Specification of Letters Patent.  Patented Aug. 11, 1908.

Application filed October 12, 1907. Serial No. 397,087.

*To all whom it may concern:*

Be it known that I, DELBERT BENNETT, a citizen of the United States, and a resident of Battle Creek, in the county of Calhoun and State of Michigan, have invented new and useful Improvements in the Manufacture of Fuel-Briquets, of which the following is a full, clear, and exact description.

The object of the invention is to provide certain new and useful improvements in the manufacture of fuel briquets from peat and other similar materials, whereby the resinous and like substances contained in the material is distributed uniformly throughout the material, to insure the formation of a briquet capable of burning uniformly and of utilizing the units of heat to the fulest advantage.

The invention consists of a method whereby the resinous and like substances contained in the material are melted and caused to permeate the material uniformly, to form a homogeneous mass.

The invention further consists in a machine for carrying the above-described method into effect, such machine being illustrated in the accompanying drawings forming a part of this specification, in which similar characters of reference indicate corresponding parts in both views.

Figure 1:
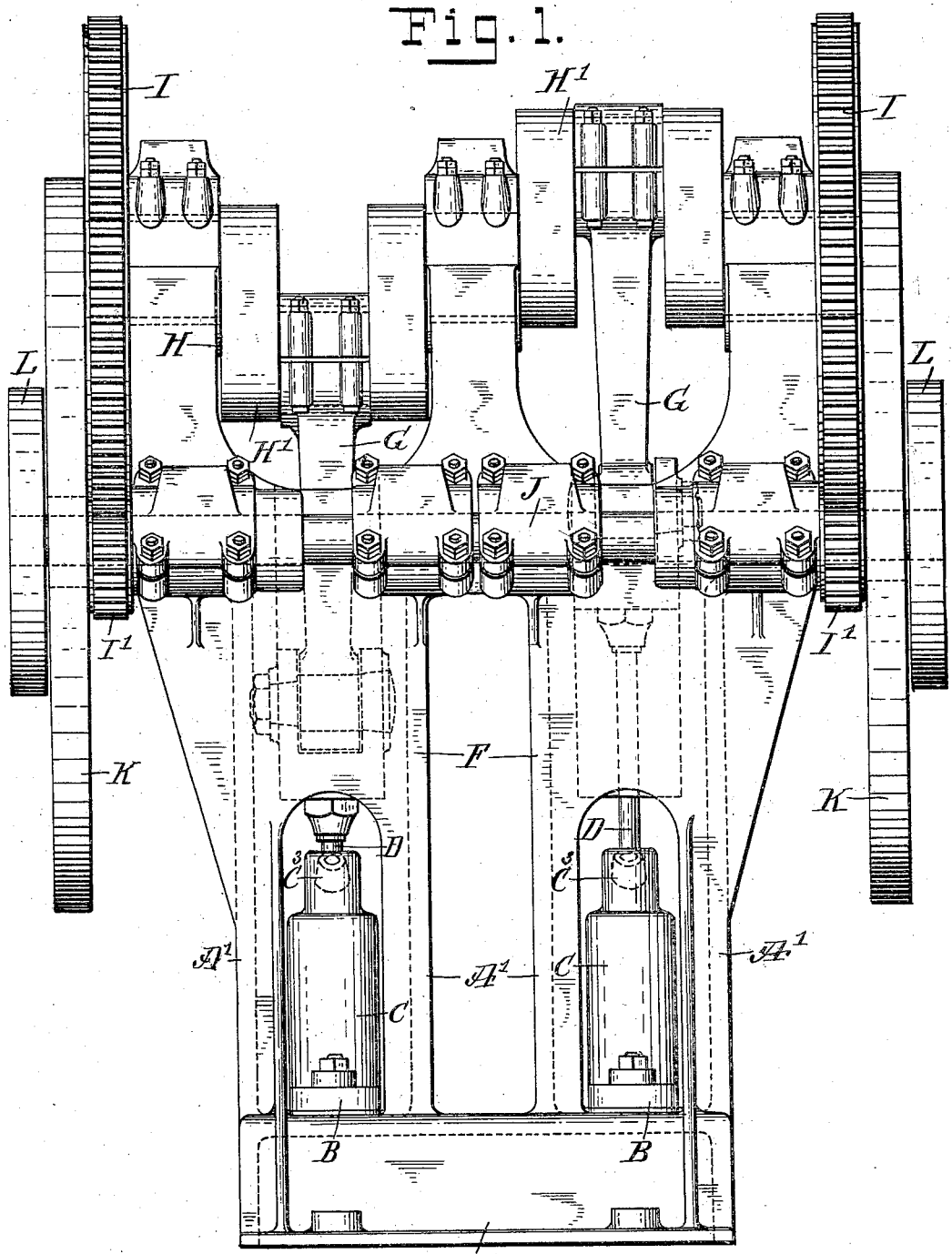
Figure 2:
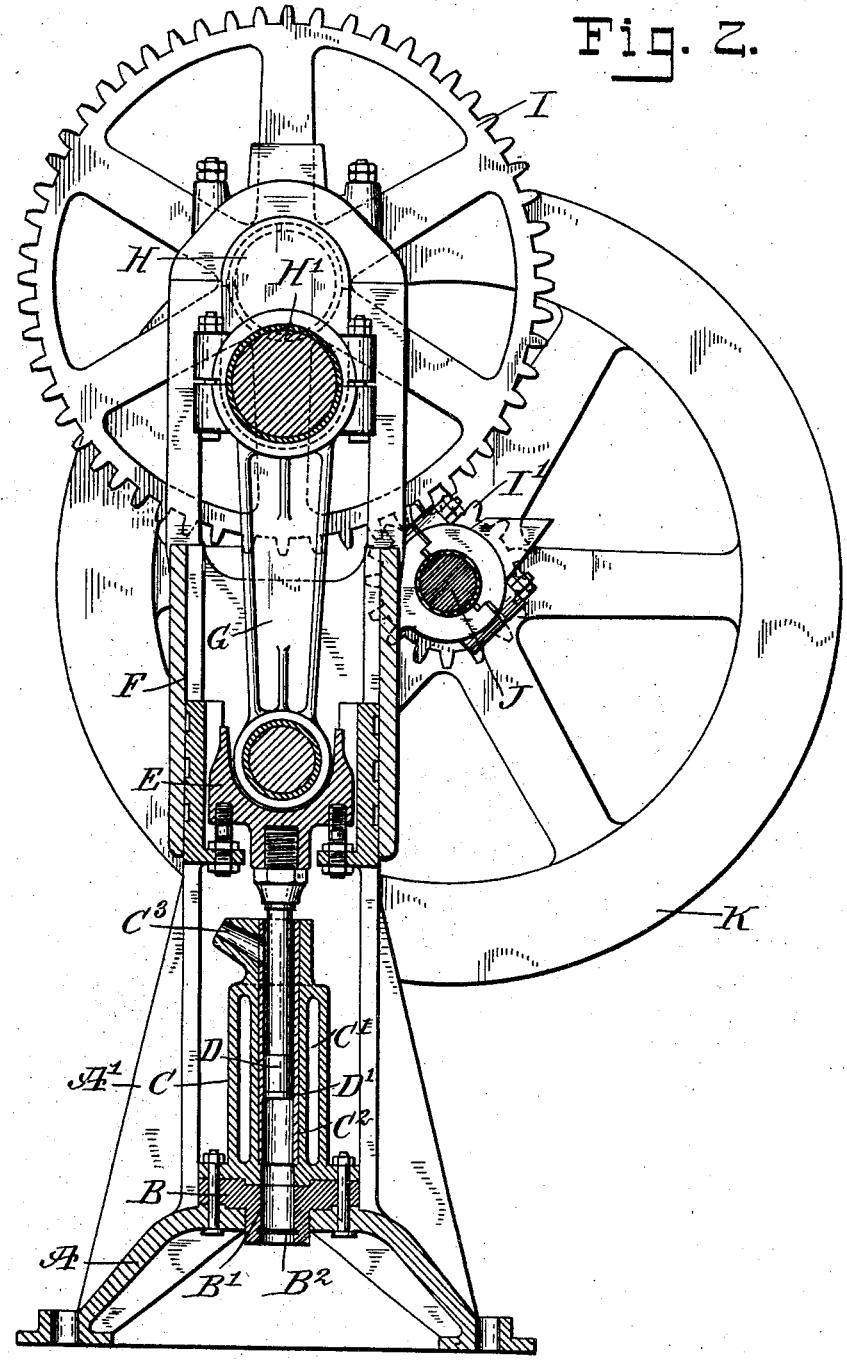

Figure 1 is a side elevation of the machine, and Fig. 2 is a transverse section of the same.

The improved briquet machine is mounted on a suitably constructed base A, supporting one or a plurality of base plates B, to each of which is bolted or otherwise secured a cylinder C having an annular steam chamber C' connected with a suitable steam supply for heating the cylinder with steam. The bore of the cylinder is provided with a lining C² of steel or other material, and which can be conveniently removed and replaced by a new one when worn out. In the lining C² of the cylinder C reciprocates a plunger D, secured at its upper end to a cross-head E, mounted to slide vertically in guideways F, arranged on standards A', forming part of the base A, the said cross-head E being pivotally connected by a pitman G with a crank arm H' of a crank shaft H, journaled in suitable bearings on the upper ends of the standards A'. The crank shaft H is provided with gear wheels I in mesh with pinions I' secured on a main shaft J, journaled in suitable bearings attached to the standards A', and on the said main shaft J are secured fly wheels K, and pulleys L, connected by belt with other machinery, for imparting a rotary motion to the main shaft J. The rotary motion given to the main shaft J is transmitted by the pinions I' and the gear wheels I to the crank shaft H, which by the crank arms H', pitmen G and the cross-heads E impart an up and down reciprocating motion to the plunger D, for compressing the material in the cylinders C, as hereinafter more fully described.

The upper end of the cylinder C is provided with an inclined inlet C³, connected with a storage bin containing the prepared peat or like material, the said inlet C³ opening into the cylinder C at a point below the bottom of the plunger D, at the time the latter is in an uppermost position. The bottom of the plunger D is preferably provided with a die plate D', provided with a suitable character for marking each briquet produced. The base plate B has an opening B' in register with the lower end of the bore of the cylinder C, and the said opening B' is intersected by a transverse slot B², adapted to receive a board or a like breakable support, for temporarily supporting the material when starting the machine, the board being capable of breaking after the compression has reached the desired degree, so that the material is discharged through the lower end of the opening B'. It is understood that when the machine is running the friction between the material and the inner wall of the lining C² is sufficient to insure proper compression of the material. The lining C² is of sufficient length to accommodate about three or four briquets at a time.

The raw peat or like material is dried so that about ten or twelve per cent. of moisture is left in the raw material and this dried material is conveyed from the storage bin by way of the inlet C³ into the cylinder C, at the time the plunger D is in an uppermost position. When the plunger D moves downward, it closes the inlet C³ and at the same time compresses the material contained in the cylinder, and which material is heated to such a degree that its resinous and like substances are melted, the melted substances permeating the material uniformly.

By the method mentioned, the briquet is seared by the combined action of the heat and pressure, which causes the natural tar in the peat to melt and to permeate the material, the result being that a briquet is formed which is very homogeneous, exceedingly hard and similar to coal.

Having thus described my invention, I claim as new and desire to secure by Letters Patent:

1. A machine for making fuel briquets, comprising an open-ended cylinder, means for heating the same, a plunger reciprocating in the said cylinder, means for feeding the briquet material into the said cylinder near the upper end thereof, and a base plate for the said cylinder and having an aperture in register with the cylinder opening, the base plate having means for supporting a breakable retainer to hold the material in the cylinder until a desired degree of compression is reached.

2. A machine for making fuel briquets, comprising an open-ended cylinder, means for heating the same, a plunger reciprocating in the said cylinder, means for feeding the briquet material into the said cylinder near the upper end thereof, and a base plate for the said cylinder and having an aperture in register with the cylinder opening, the base plate having a slot intersecting the base plate aperture and adapted to receive a breakable retaining plate to hold the peat in the material until the desired compression is reached.

3. A machine for making fuel briquets, comprising an open-ended cylinder, a plunger reciprocating in the cylinder, means for feeding the briquet material into the said cylinder near the upper end thereof, and a base plate for the said cylinder and having an aperture in register with the cylinder opening, said base plate having a slot intersecting the aperture for receiving a breakable retaining plate for the purpose set forth.

4. A machine for making fuel briquets, comprising an open-ended cylinder, a plunger reciprocating in the cylinder, a cross head carrying the plunger, a crank shaft, a pitman connecting the crank shaft with the cross head, and a base plate to which the cylinder is attached, said base plate having an opening therethrough provided with a slot for receiving a breakable retaining plate for the purpose set forth.

In testimony whereof I have signed my name to this specification in the presence of two subscribing witnesses.

DELBERT BENNETT.

Witnesses:
J. H. GREEN,
IRA A. BECK.